United States Patent
Takahashi

(10) Patent No.: US 8,472,959 B2
(45) Date of Patent: Jun. 25, 2013

(54) COMMUNICATION CONTROL SYSTEM AND COMMUNICATION CONTROL METHOD

(75) Inventor: Masaru Takahashi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/386,237

(22) PCT Filed: Jun. 29, 2010

(86) PCT No.: PCT/JP2010/061053
§ 371 (c)(1),
(2), (4) Date: Jan. 20, 2012

(87) PCT Pub. No.: WO2011/010530
PCT Pub. Date: Jan. 27, 2011

(65) Prior Publication Data
US 2012/0115484 A1    May 10, 2012

(30) Foreign Application Priority Data
Jul. 21, 2009 (JP) ................. 2009-170379

(51) Int. Cl.
*H04H 20/40* (2008.01)
(52) U.S. Cl.
USPC ........... 455/436; 455/437; 455/438; 455/439; 455/448
(58) Field of Classification Search
USPC .................. 455/436, 448; 370/331
See application file for complete search history.

(56) References Cited

U.S. PATENT DOCUMENTS

| | | | |
|---|---|---|---|
| 6,765,901 B1 | 7/2004 | Johnson et al. | |
| 6,810,256 B2 * | 10/2004 | Stuempert et al. | 455/439 |
| 7,227,888 B2 | 6/2007 | Lemieux | |
| 7,483,375 B2 | 1/2009 | Johnson et al. | |
| 7,996,568 B2 | 8/2011 | Johnson et al. | |
| 2003/0040307 A1 | 2/2003 | Lemieux et al. | |

(Continued)

FOREIGN PATENT DOCUMENTS

| | | |
|---|---|---|
| JP | 9-200338 | 7/1997 |
| JP | 2001-309432 | 11/2001 |

(Continued)

OTHER PUBLICATIONS

Japanese Office Action issued Feb. 28, 2012 in patent application No. 2009-170379 with English translation.

(Continued)

*Primary Examiner* — Patrick Edouard
*Assistant Examiner* — Julio Perez
(74) *Attorney, Agent, or Firm* — Oblon, Spivak, McClelland, Maier & Neustadt, L.L.P.

(57) ABSTRACT

A system that selects an optimum codec flexibly adapting to a change in the communication environment and to switch to the optimum codec during communication. A communication control system includes a handover detection unit detecting a handover in which a communication terminal present in a communication area formed by a BTS moves from the communication area to a communication area formed by another BTS, an information acquisition unit acquiring, if the handover detection unit detects a handover, information based on the handover for use in codec switching, a codec selecting unit selecting a codec after switching based on the information acquired by the information acquisition unit, and a codec switching unit controlling such that the codec after switching that is selected by the codec selecting unit is applied to the communication currently performed.

5 Claims, 13 Drawing Sheets

U.S. PATENT DOCUMENTS

| | | |
|---|---|---|
| 2005/0005025 A1 | 1/2005 | Harville et al. |
| 2006/0223519 A1 | 10/2006 | Yahagi |
| 2007/0044002 A1 | 2/2007 | Johnson et al. |
| 2009/0059857 A1 * | 3/2009 | Kim et al. .................... 370/329 |

FOREIGN PATENT DOCUMENTS

| | | |
|---|---|---|
| JP | 2002-518892 | 6/2002 |
| JP | 2004 530339 | 9/2004 |
| JP | 2004 531932 | 10/2004 |
| JP | 2006 12103 | 1/2006 |
| JP | 2006 287445 | 10/2006 |
| JP | 2007 228484 | 9/2007 |
| JP | 2007-531332 | 11/2007 |
| JP | 2010 44175 | 2/2010 |

OTHER PUBLICATIONS

3GPP TS 25.331, "3$^{rd}$ Generation Partnership Project; Technical Specification Group Radio Access Network; Radio Resource Control (RRC); Protocol Specification," vol. 8, No. 7, pp. 1-1685 (Jun. 2009).

International Search Report Issued Oct. 12, 2010 in PCT/JP10/61053 Filed Jun. 29, 2010.

English translation of the International Preliminary Report on Patentability and Written Opinion issued Feb. 16, 2012 in patent application No. PCT/JP2010/061053 filed Jun. 29, 2010.

* cited by examiner

Fig.5

| PATTERN | CALLER SIDE | RECEIVER SIDE | CODEC |
|---|---|---|---|
| 1 | CDMA | CDMA | AMR-NB |
| 2 | CDMA | HSDPA | AMR-NB |
| 3 | HSDPA | HSDPA | AMR-WB |
| 4 | Any | RESTRICTED | AMR-NB |
| ... | | | |

*Fig.6*

| NODE | CPU LOAD | MANUAL RESTRICTION INFORMATION |
|---|---|---|
| RNC/BTS(CDMA) | 20% | - |
| RNC/BTS(HS) | 40% | - |
| CS-GW-A | | - |
| CS-GW-B | | - |
| CS-GW-C | | UNDER RESTRICTION |

COMMUNICATION CONTROL SYSTEM AND COMMUNICATION CONTROL METHOD

TECHNICAL FIELD

The present invention relates to a communication control system and a communication control method.

BACKGROUND ART

As a technique for switching codecs, for example, Patent Literature 1 discloses a technique of changing codecs according to the type of communication card.

CITATION LIST

Patent Literature

Patent Literature 1: Japanese Patent Application Laid-Open Publication No. 2006-12103

SUMMARY OF INVENTION

Technical Problem

However, the method described in Patent Literature 1 has a problem of being unable to select an optimum codec flexibly adapting to a change in the communication environment and to switch to the optimum code during communication, because the type of communication card is determined when communication is initiated, and a codec is selected based on the determination result.

Therefore, in order to solve the problem above, the present invention aims to provide a communication control system and a communication control method capable of selecting an optimum codec flexibly adapting to a change in the communication environment, and switching to the optimum codec during communication.

Solution to Problem

In order to solve the aforementioned problem, a communication control system of the present invention includes a handover detection unit detecting a handover in which a communication terminal present in a communication area formed by a base station moves from the communication area to a communication area formed by another base station, an information acquisition unit acquiring, if the handover detection unit detects a handover, information based on the handover for use in codec switching for switching a codec applied to communication currently performed by the communication terminal, a codec selecting unit selecting a codec after switching based on the information acquired by the information acquisition unit, and a codec switching unit controlling such that the codec after switching that is selected by the codec selecting unit is applied to the communication currently performed.

In this configuration, when a handover takes place, a codec after switching is selected based on information about the handover, and communication to which the codec after switching is applied is performed. Therefore, it is possible to select an optimum codec flexibly adapting to a change in the communication environment and to switch to the optimum codec during communication.

Suitably, the information acquisition unit of the communication control system further includes a network load detection unit detecting a load status in a communication network to which the other base station connects.

In this configuration, a more proper codec can be selected by detecting a load status in the handover-destination network.

Suitably, the network load detection unit senses a CPU load in network equipment provided in the communication network for controlling communication performed by the communication terminal and detects the load status in the communication network based on the sensed CPU load. The load status in the network can be detected reliably by sensing the CPU load.

Suitably, when the load status in the communication network that is detected by the network load detection unit indicates a load greater than a prescribed threshold, the codec selecting unit selects a codec having the lowest quality among applicable codecs, as the codec after switching. When the load on the network is heavy, any additional load on the network can be minimized by selecting a codec having the lowest quality.

Suitably, the network load detection unit senses a probability of call loss in the communication network and detects a load status in the communication network based on the sensed probability of call loss. Accordingly, the load status in the network that conforms more to the actual load status can be detected.

Suitably, the information acquisition unit further includes a communication scheme detection unit detecting a communication scheme in communication performed between the communication terminal and the other base station. The codec after switching can be selected according to the communication scheme.

Suitably, the communication scheme detection unit additionally detects another communication scheme performed by another communication terminal on another end communicating with the communication terminal, and the codec selecting unit selects the codec after switching based on a communication scheme having lower quality between the communication scheme and the other communication scheme. The codecs can be switched more safely based on the communication scheme having lower quality.

Suitably, the communication control system further includes a holding unit storing and holding restriction information indicating that communication restriction is imposed on a prescribed area. The codec selecting unit refers to the restriction information held by the holding unit and, if the communication terminal is present in the area indicated by the restriction information, selects a codec having the lowest quality among applicable codecs, as the codec after switching.

Accordingly, for example when an event that attracts many people is held, the quality of communication is limited (restrictions on communication) only for a prescribed area, thereby ensuring a greater number of communications.

In order to solve the aforementioned problem, a communication control method of the present invention includes a handover detection step of detecting a handover in which a communication terminal present in a communication area formed by a base station moves from the communication area to a communication area formed by another base station, an information acquisition step of, if a handover is detected in the handover detection step, acquiring information based on the handover for use in codec switching for switching a codec applied to communication currently performed by the communication terminal, a codec selecting step of selecting a codec after switching based on the information acquired in the information acquisition step, and a codec switching step of controlling such that the codec after switching that is selected in the codec selecting step is applied to the communication currently performed.

In this configuration, when a handover takes place, a codec after switching is selected based on information about the handover, and communication to which the codec after switching is applied is performed. Therefore, it is possible to select an optimum codec flexibly adapting to a change in the communication environment and to switch to the optimum codec during communication.

Advantageous Effects of Invention

The present invention provides a communication control system and a communication control method capable of selecting an optimum codec flexibly adapting to a change in the communication environment, and switching to the optimum codec during communication.

BRIEF DESCRIPTION OF DRAWINGS

FIG. 5 is a diagram for explaining a method of selecting a codec after switching by a codec selecting unit shown in FIG. 4.

FIG. 6 is a diagram showing an example of information held by a node load information holding unit shown in FIG. 4.

DESCRIPTION OF EMBODIMENTS

Figure 1:
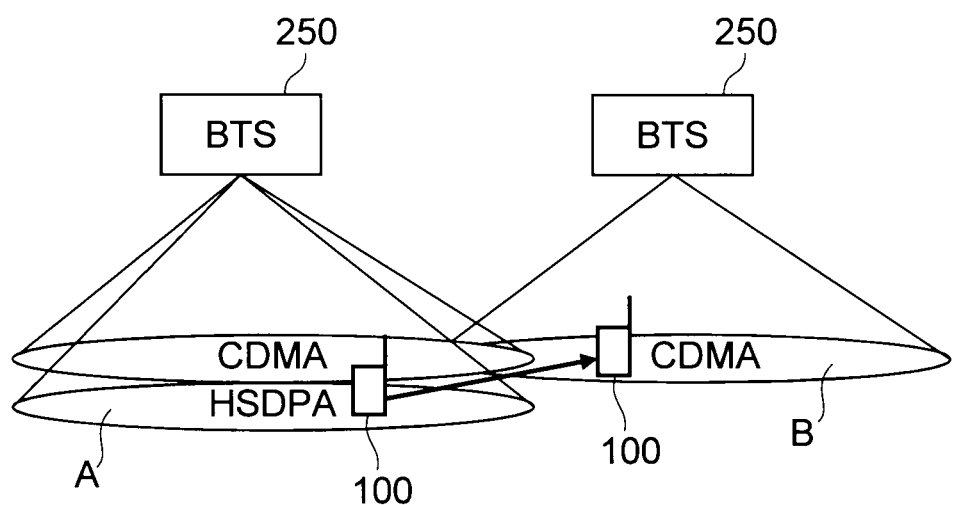
FIG. 1 is a diagram for explaining an overview of the present invention.

Embodiments of the present invention will be described with reference to the accompanying drawings. The same parts are denoted with the same reference numerals, if possible, and an overlapping description will be omitted.

Preconditions of the present embodiment will be described using FIG. 1. A description of each component in FIG. 1 will be given later. In a communication control system 10 in the present embodiment, a plurality of communication schemes can be used. As examples of communication schemes for explanation of the invention, the CDMA (Code Division Multiple Access) scheme and the HSDPA (High Speed Downlink Packet Access) scheme are used. However, these communication schemes are illustrative and not intended to be limitative. The HSDPA scheme is capable of faster communication. The capability of fast communication will be expressed hereinafter as "having high quality."

Furthermore, the communication control system 10 and a communication terminal 100 in the present embodiment can apply one selected from different kinds of codecs to communication. As examples of codecs for explaining the invention, AMR-NB (adaptive multi-rate Narrowband) and AMR-WB (adaptive multi-rate Wideband) are used. However, these codecs are illustrative and not intended to be limitative. Three or more kinds of codecs may be used. In the present embodiment, the amount of transmitted and received data is increased by applying AMR-WB rather than by applying AMR-NB. The codec with which the amount of transmitted and received data is increased will be expressed hereinafter as "having high quality." Applying a prescribed codec to communication means that communication is performed according to that codec.

As shown in FIG. 1, a BTS (base station) 250 can construct a communication area in which the CDMA scheme can be used or a communication area in which HSDPA can be used.

The communication terminal 100 in the present embodiment alone can use a plurality of communication schemes. Additionally, the communication terminal 100 can perform a handover when moving across a communication area border during communication and can continue communication with the changed communication scheme that is usable in the communication area of the moving destination. In the example in FIG. 1, the communication terminal 100 moves from a communication area A to a communication area B.

Figure 2:
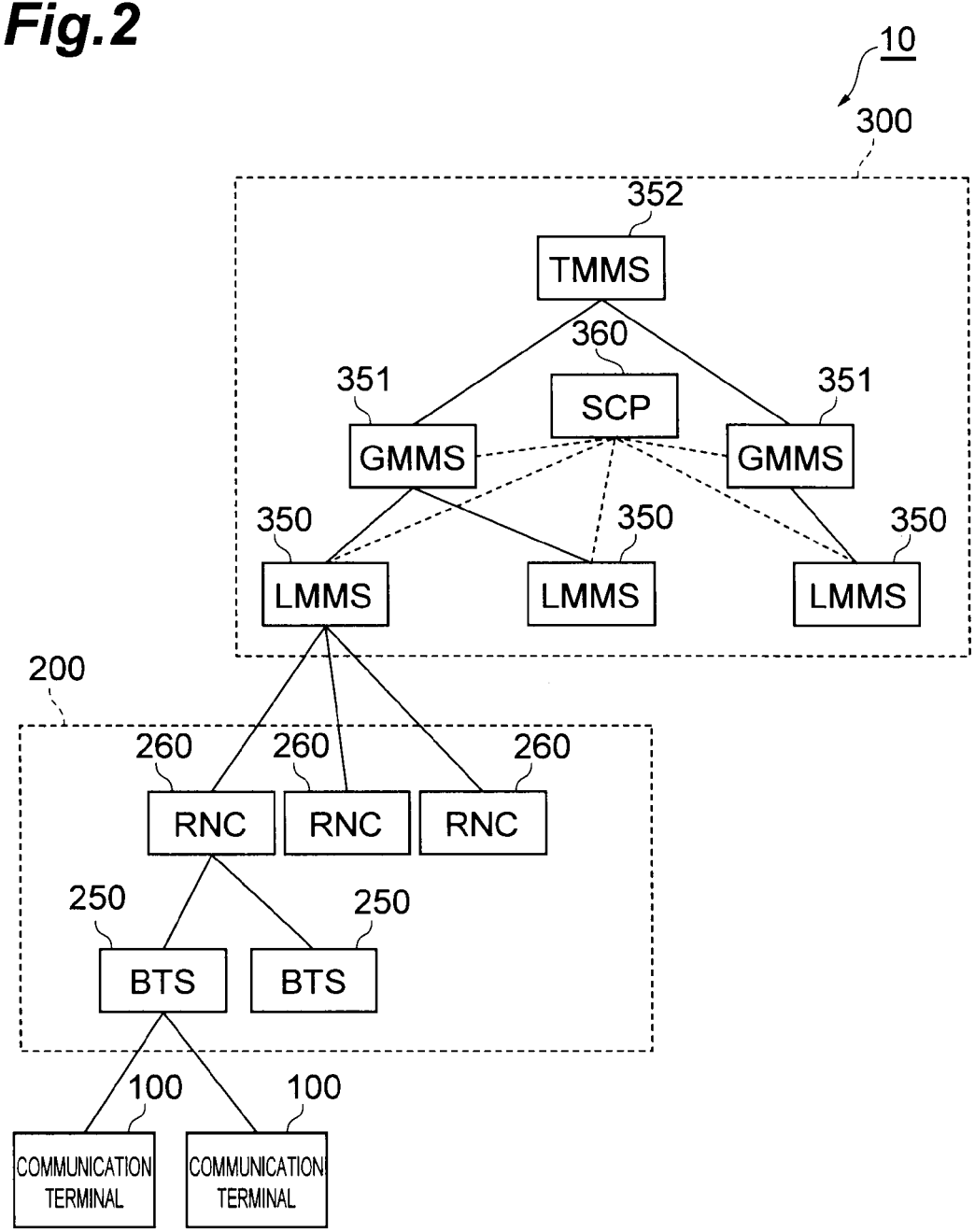
FIG. 2 is a diagram showing an exemplary configuration of a communication control system in the present embodiment.
Figure 3:
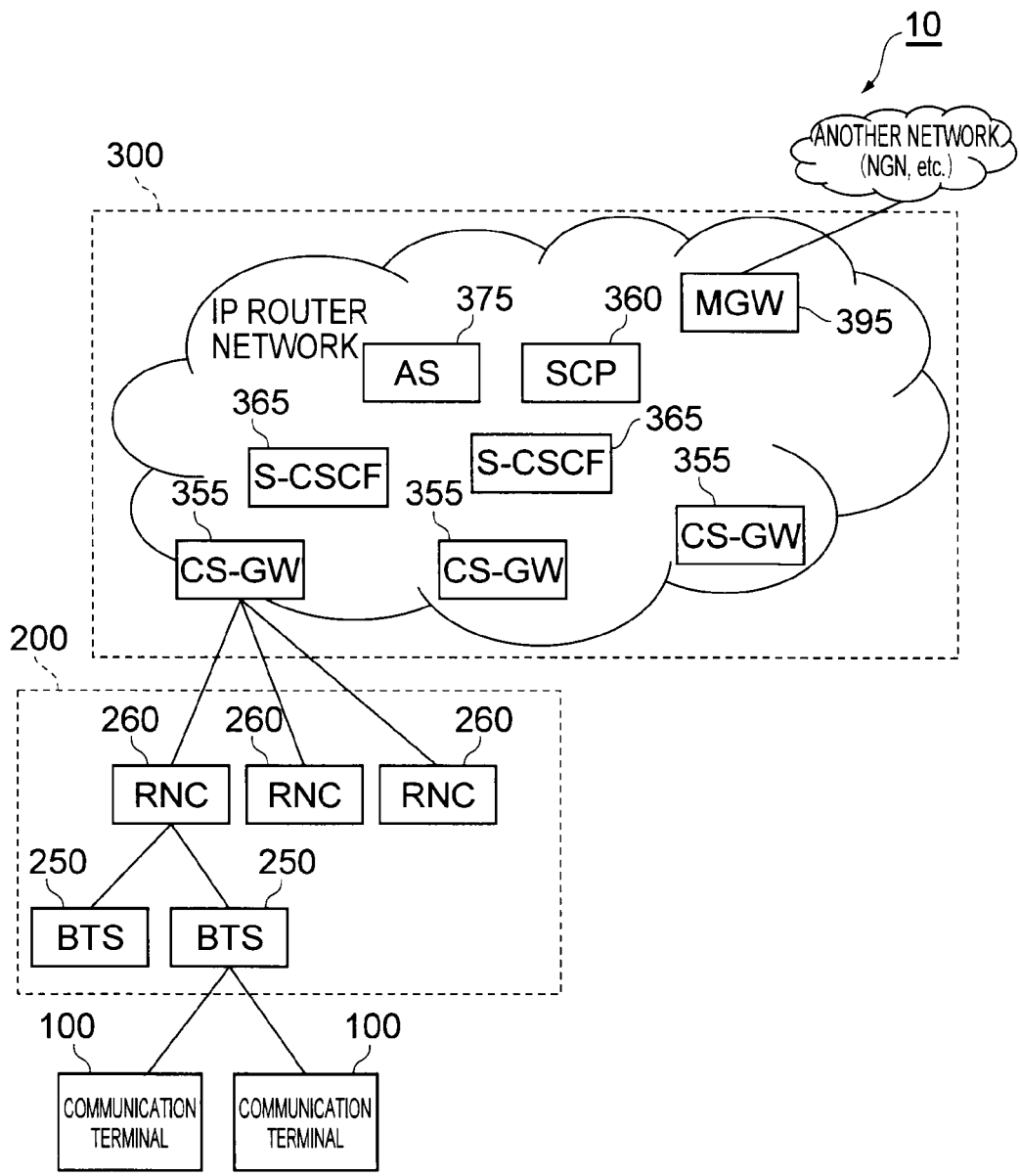
FIG. 3 is a diagram showing an exemplary configuration of the communication control system in the present embodiment.

FIG. 2 and FIG. 3 are diagrams showing examples of a system configuration of the communication control system 10. As shown in FIG. 2, this communication control system 10 is configured to include communication terminals 100, a radio control unit 200, and a core network unit 300. The communication control system 10 shown in FIG. 2 has a system configuration using an IMT (International Mobile Telecommunications) network as an example. In this case, as shown in FIG. 2, the components build up a hierarchical structure.

The radio control unit 200, which controls a wireless part in the communication control system 10, is configured to include BTSs (base stations) 250 each forming a communication area in which the communication terminal 100 is present, and RNCs (Radio Network Controllers) 260 communicating with the communication terminals 100 through the BTSs 250 and performing control on a wireless network.

The core network unit 300, which is a wired network part in the communication control system 10 and performs control on the radio control unit 200, route control, and the like, is configured to include LMMSs (Local Mobile Multimedia Switching Systems) 350, GMMSs (Gateway Multimedia Switching Systems) 351, a TMMS (Transit Multimedia Switching System) 352, and an SCP (Service Control Point) 360.

Here, MMS refers to a physical node having the function of MSC (Mobile Switching Center)/VLR (Visitor Location Register) which is a logical node performing circuit switching network control. In the present embodiment, the LMMSs 350, the GMMSs 351, and the TMMS 352 are hierarchically provided and combined to function to perform circuit switching network control, thereby implementing the function of each component in the communication control system 10 as described later.

The SCP 360 in the present embodiment is a node providing a function as a database. Specifically, it mainly holds information about the location of the called-side communication terminal 100.

The system configuration of the communication control system 10 including the core network unit 300 in the present embodiment is not limited to the example above. For example, it may be a system configuration as shown in FIG. 3. In the example in FIG. 2, the core network unit 300 has a hierarchical structure, whereas in the example in FIG. 3, the hierarchical structure is not employed and the nodes have a flat relation with each other over an IP router network.

As shown in FIG. 3, the core network unit 300 in this example is configured to include CS-GWs (Circuit Switch-Gateways) 355 serving as nodes having a function of terminating SIP, S-CSCFs (Serving Call Session Control Functions) 365 and an AS (Application Server) 375 serving as nodes controlling the CS-GWs 355, an SCP 360, and an MGW (Media Gateway) 395 to another network (for example, NGN). It is noted that the NGN (Next Generation Network) is a next generation telephone network using the IP (Internet Protocol) technique, that is, a network for implementing a multimedia service in which telephony, data communication, and streaming broadcast are combined (Triple Play).

Also in this case, the CS-GWs 355, the S-CSCFs 365, the AS 375, and the SCP 360 communication with each other using IP thereby to implement the function of each component in the communication control system 10 as described later. Also in the case shown in FIG. 3, the system configuration of the radio control unit 200 is similar to the one described using FIG. 2.

Figure 4:
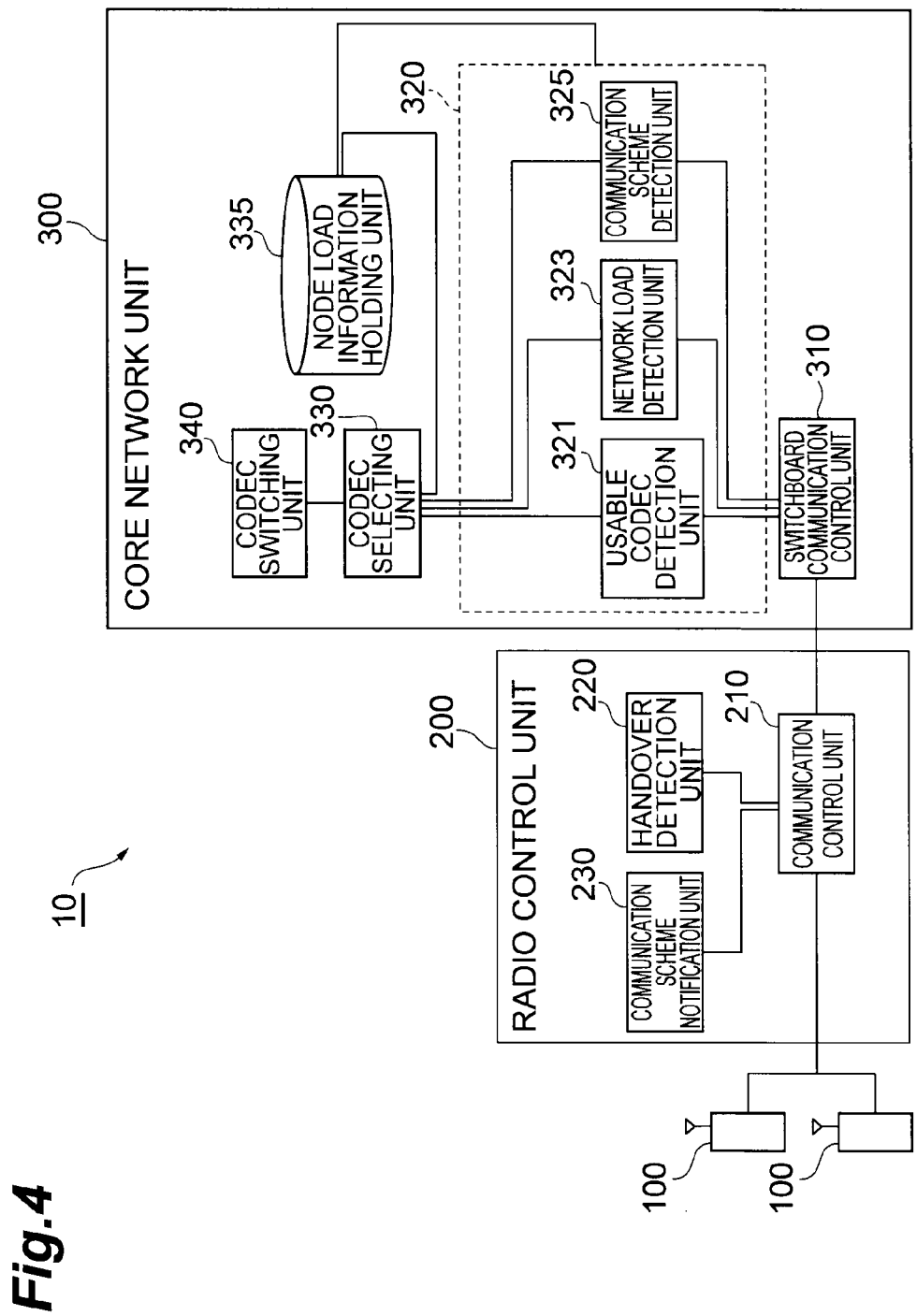
FIG. 4 is a diagram showing a functional configuration of a radio control unit and a core network unit shown in FIG. 2 and FIG. 3.

FIG. 4 shows a functional configuration of the radio control unit 200 and the core network unit 300 in the present embodiment. As shown in FIG. 4, specifically, the radio control unit 200 is configured to include a communication control unit 210, a handover detection unit 220, and a communication scheme notification unit 230.

The communication control unit 210 has the functions of controlling communication between the radio control unit 200 and the communication terminal 100 as well as between the radio control unit 200 and the core network unit 300. These functions are implemented mainly by a radio communication device (not shown) physically included in the BTS 250 in FIG. 2 and FIG. 3 and by a network card (not shown) physically included in the RNC 260. For example, a variety of signals received by the BTS 250 from the communication terminal 100 through the radio communication device are sent to the RNC 260. After screening of the signals (information) in the RNC 260, the RNC 260 transmits a necessary signal (information) to the core network unit 300 mainly through the network card.

The handover detection unit 220 has the function of detecting that a handover is executed when the communication terminal 100 present in a communication area formed by one BTS 250 moves from that communication area to a communication area formed by another BTS 250.

The handover detection unit 220 additionally has the function of, upon detecting that the communication terminal 100 performs a handover, transmitting a notification that a handover is detected and a handover destination identifier that can uniquely identify a handover-destination communication area, to the core network unit 300 through the communication control unit 210. Here, specifically, for the handover destination identifier, a device number (serial number) of the handover-destination BTS 250 may be used if a handover takes place between the BTSs 250 under the same RNC 260. If a handover takes place between the BTSs 250 under different RNCs 260, a code combination of the device number (serial number) of the RNC 260 to which the handover-destination BTS 250 connects and the device number (serial number) of the handover-destination BTS 250 may be used.

Specifically, the communication terminal 100 includes a transmission unit (not shown) transmitting to the RNC 260 a branch addition report concerning a branch (a connection point of the device) added during a handover. The handover detection unit 220 can detect the handover of the communication terminal 100 by receiving this information. The BTS 250 receives the branch addition report from the communication terminal 100 under the control of the RNC 260. Upon receiving the branch addition report, the BTS 250 transmits the received branch addition report to the RNC 260. It is noted that the standard specification "Radio Resource Control (RRC) Protocol Specification: 3GPP TS 25.331" stipulates that "ACTIVE SET UPDATE COMPLETE" message is transmitted from the communication terminal 100 to the RNC 260 at the time of branch addition, and the present embodiment can be carried out in compliance therewith. However, the present invention is not limited to the method defined in the standard specification.

The communication scheme notification unit 230 is implemented, for example, by the RNC 260, and has the function of giving a notification of the communication scheme of communication performed by the communication terminal 100, to the core network unit 300 through the communication control unit 210. In the present embodiment, the communication scheme performed by the communication terminal 100 is determined based on the kind of the channel through which the communication is performed.

More specifically, the communication terminal 100 performs communication using DCH (data channel) which is a channel for use in the communication with the BTS 250 using CDMA when the communication terminal 100 and the BTS 250 perform communication using the CDMA scheme, for example, when the communication terminal 100 is an R99 terminal only adapted to the CDMA scheme or when the communication terminal 100 is present in a communication area in which only CDMA is usable. On the other hand, when the BTS 250 and the communication terminal 100 perform communication using the HSDPA scheme, the communication terminal 100 communicates with the BTS 250 using HSDSCH (High-Speed Downlink Shared Channel) which is a dedicated channel for HSDPA. Therefore, the communication scheme notification unit 230 senses the communication scheme based on which channel is used to perform communication between the BTS 250 and the communication terminal 100, and transmits information of the sensed communication scheme to the core network unit 300.

It is noted that the communication scheme notification unit 230 may transmit information of the channel to the core network unit 300, instead of notifying the core network unit 300 of information of the communication scheme.

The timing for the communication scheme notification unit 230 to transmit the information of the communication scheme or the channel to the core network unit 300 is suitably the timing at which it receives a signal concerning a transmission request from a communication scheme detection unit 325 of the core network unit 300 as described later.

The core network unit 300 is configured to include a switchboard communication control unit 310, an information acquisition unit 320, a codec selecting unit 330, a codec switching unit 340, and a node load information holding unit (holding unit) 335.

The switchboard communication control unit 310 has the function of controlling communication between the core network unit 300 and the radio control unit 200. The RNC 260 is one node connected to the LMMS 350 through a wired line. The communication between the RNC 260 and the LMMS 350 is physically controlled, for example, by communication cards (not shown) of these nodes.

The functions of the core network unit 300 in the present embodiment described below may be physically implemented by any node in the core network unit 300. A dedicated server having one function may be provided separately. One function may be distributed over a plurality of servers. In order to output a necessary signal to the physical location of the nodes or the servers existing in the core network unit 300 for implementing these functions, the LMMS 350, the GMMS 351, the TMMS 352, and the SCP 360 cooperate to control communication. The CS-GW 355, the S-CSCF 365, the AS 375, and the SCP 360 cooperate to control communication using IP. The function of the switchboard communication control unit 310 is implemented by them.

The information acquisition unit 320 has the function of, upon receiving information that the handover detection unit 220 detects a handover through the switchboard communication control unit 310, acquiring information for use in codec switching for switching a codec applied to the communication performed by the communication terminal 100 with the BTS 250, and outputting the acquired information to the codec selecting unit 330.

Specifically, the information acquisition unit 320 is configured to include a usable codec detection unit 321, a network load detection unit 323, and a communication scheme detection unit 325. The usable codec detection unit 321 has the function of detecting the kind of codec usable by the communication terminal 100 by asking the communication terminal 100 about a codec usable by the communication terminal 100 through the switchboard communication control unit 310. The usable codec detection unit 321 receives a signal returned by the communication terminal 100 in response to the asking through the switchboard communication control unit 310, thereby detecting the kind of codec usable by the communication terminal 100. This asking may be done, for example, at a timing when connection to a communication network by the communication terminal 100 is detected.

The usable codec detection unit 321 additionally has the function of outputting the kind of the detected codec to the codec selecting unit 330. Specifically, when the handover detection unit 220 of the radio control unit 200 detects a handover and gives a notification thereof to the information acquisition unit 320, the usable codec detection unit 321 notifies the codec selecting unit 330 of the kind of codec usable by the communication terminal 100.

The network load detection unit 323 has the function of detecting a load on the handover-destination network when the handover detection unit 220 detects a handover. Specifically, the network load detection unit 323 has the function of inputting a handover destination identifier from the handover detection unit 220 through the switchboard communication control unit 310 when the handover detection unit 220 detects a handover, and detecting a load status in the communication network to which the BTS 250 that constructs the handover-destination communication area indicated by the input handover destination identifier connects.

The network load detection unit 323 additionally has the function of outputting the detected load status in the network to the codec selecting unit 330 described later.

The load status in the network is, for example, a CPU load of the LMMS 350, the GMMS 351, the TMMS 352, the CS-GW 355, the S-CSCF 365, or the AS 375 (network equipments controlling the communication performed by communication terminal 100) in the network to which the BTS 250 forming the handover-destination communication area connects when the communication terminal 100 performs a handover. The load status in the communication network may be detected by sensing the CPU load and based on the sensed CPU load. Preferably, the CPU load is managed, for example, by dividing into certain widths (for example, a width of 10%) with consideration for the burden on the processing.

Furthermore, the load status in the network may be detected based on the probability of call loss which is the probability that connection is blocked with respect to the number of calls. In this case, specifically, a notification of the probability of call loss may be manually given from an NOC (Network Operation Center) to a node in the core network unit 300, for example, the LMMS 350.

In the foregoing description, the network load detection unit 323 detects the load status in the handover-destination network when the handover detection unit 220 detects a handover. However, the network load detection unit 323 may always detect the load status in the network. In this case, the network load detection unit 323 outputs the detected load status in the network not to the codec selecting unit 330 but to the node load information holding unit 335 described later.

The communication scheme detection unit 325 has the function of, when communication terminal 100 performs a handover, detecting the communication scheme performed between the BTS 250 that forms the handover-destination communication area and the communication terminal 100 that has performed the handover, and the communication scheme of the communication performed by the communication terminal 100 on the other end communicating with the communication terminal 100.

Specifically, the communication scheme detection unit 325 transmits to the communication scheme notification unit 230 a signal concerning a transmission request which is a signal requesting transmission of information about the communication scheme performed by the communication terminal 100 that has performed the handover. When the communication scheme notification unit 230 transmits the information about the communication scheme, the communication scheme detection unit 325 receives the information about the communication scheme through the switchboard communication control unit 310. Furthermore, the communication scheme detection unit 325 asks the radio control unit 200 that includes the BTS 250 that constructs the area in which the communication terminal 100 on the other end communicating with the communication terminal 100 performing the handover is present about the communication scheme of the communication performed by the communication terminal 100 on the other end, through the switchboard communication control unit 310.

The codec selecting unit 330 has the function of inputting the kind of codec usable by the communication terminal 100, the load status in the network, and the information about the communication scheme from the usable codec detection unit 321, the network load detection unit 323, and the communication scheme detection unit 325, respectively, and selecting a codec after switching that is a codec to be applied to the communication after the handover, based on the input information.

Specifically, the codec selecting unit 330 confirms whether the CPU load ratio in the network equipment controlling the communication performed by the communication terminal 100 to serve as the load status in the network that is input from the network load detection unit 323, is equal to or greater than a prescribed threshold. The prescribed threshold may be set freely by the system administrator.

Next, the codec selecting unit 330 receives the handover destination identifier from the radio control unit 200 through the switchboard communication control unit 310 and confirms whether a manual communication restriction is imposed on the handover-destination communication area by referring to the node load information holding unit 335 described later.

If the CPU load ratio is equal to or greater than the prescribed threshold or if a manual communication restriction is imposed on the handover-destination communication area, the codec selecting unit 330 selects, as a codec after switching, the codec having the lowest quality among the codecs usable by the communication terminal 100 that are detected by the usable codec detection unit 321.

If neither condition above is satisfied, the codec selecting unit 330 selects a codec after switching based on the communication scheme of communication performed by the communication terminal 100 that has performed the handover and the communication scheme in the communication terminal 100 on the other end communicating with the communication terminal 100, which are received from the communication scheme detection unit 325.

Description will be given with reference to FIG. 5. The node load information holding unit 335 holds the information shown in FIG. 5 in advance. In FIG. 5, for the sake of convenience, the communication terminals 100 on the caller side and the receiver side are distinguished. However, the communication terminal 100 that performs a handover may be either the caller side or the receiver side. The codec selecting unit 330 selects a codec after switching based on the combination of the communication scheme of communication performed by the caller-side communication terminal 100 with the BTS 250 and the communication scheme of communication performed by the receiver-side communication terminal 100 with the BTS 250, which are received from the communication scheme detection unit 325 in the core network unit 300. An example of a method of selecting a codec after switching is shown in FIG. 5.

As shown in this figure, the codec selecting unit 330 selects AMR-NB having relatively low quality as a codec after switching when both or one of the caller-side communication terminal 100 and the receiver-side communication terminal 100 performs communication using the CDMA scheme. The codec selecting unit 330 selects AMR-WB having relatively high quality as a codec after switching when both of the caller-side communication terminal 100 and the receiver-side communication terminal 100 perform communication using the HSDPA scheme. In other words, the codec selecting unit 330 selects a codec after switching based on the communication scheme having lower quality between the communication scheme performed by the caller-side communication terminal 100 and the communication scheme performed by the receiver-side communication terminal 100 (in the example for explanation of the invention in the present embodiment, based on the CDMA scheme if at least one of the caller side and the receiver side performs communication using the CDMA scheme, or the HSDPA scheme if both perform communication using the HSDPA scheme).

The codec switching unit 340 has the function of determining whether codec switching is necessary and the function of controlling communication such that the codec after switching selected by the codec selecting unit 330 is applied to the communication performed by the communication terminal 100.

Specifically, the codec switching unit 340 inputs the codec after switching selected by the codec selecting unit 330 from the codec selecting unit 330, compares the currently applied codec with the input codec after switching, and if they agree, determines that codec switching is unnecessary. If they are different, it is determined that codec switching is necessary. If it is determined that codec switching is necessary, the codec switching unit 340 transmits a signal asking the communication terminal 100 performing communication to perform communication with the codec after switching selected by the codec selecting unit 330.

The codec switching unit 340 may not necessarily ask both communication terminals 100 performing communication to apply the same codec. Different codecs may be employed for them as described later.

The node load information holing unit 335 has the function of holding "manual restriction information" which is information indicating that a communication restriction is manually imposed on a particular area.

In the example described above, the network load detection unit 323 detects the load status in the network at the point of time when the handover detection unit 220 detects a handover. However, the network load detection unit 323 may always detect the load status in the network. In this case, the node load information holding unit 335 additionally has the function of holding the load status in the network.

FIG. 6 shows an example of the information held by the node load information holding unit 335 in such a case. As shown in this figure, the node load information holding unit 335 holds the CPU load of each node included in the core network unit 300 as the load status in the network, and "manual restriction information" associated with the node. In the "manual restriction information," information "under restriction" is held to indicate the area in which the quality of communication is limited (restrictions on communication), for example, due to the holding of fireworks or any other event. It is noted that here "the quality of communication is limited" means that the amount of communication available per communication terminal 100 is reduced. The limitation on communication in this manner can increase the number of communication terminals 100 that can establish communication even with the reduced quality.

In the case where the network load detection unit 323 always detects the load status in the network, in selecting a codec after switching, the codec selecting unit 330 may obtain information of the load status in the network by referring to the information held by the node load information holding unit 335 shown in FIG. 6, instead of inputting the load status from the communication scheme detection unit 325 each time.

Figure 7:
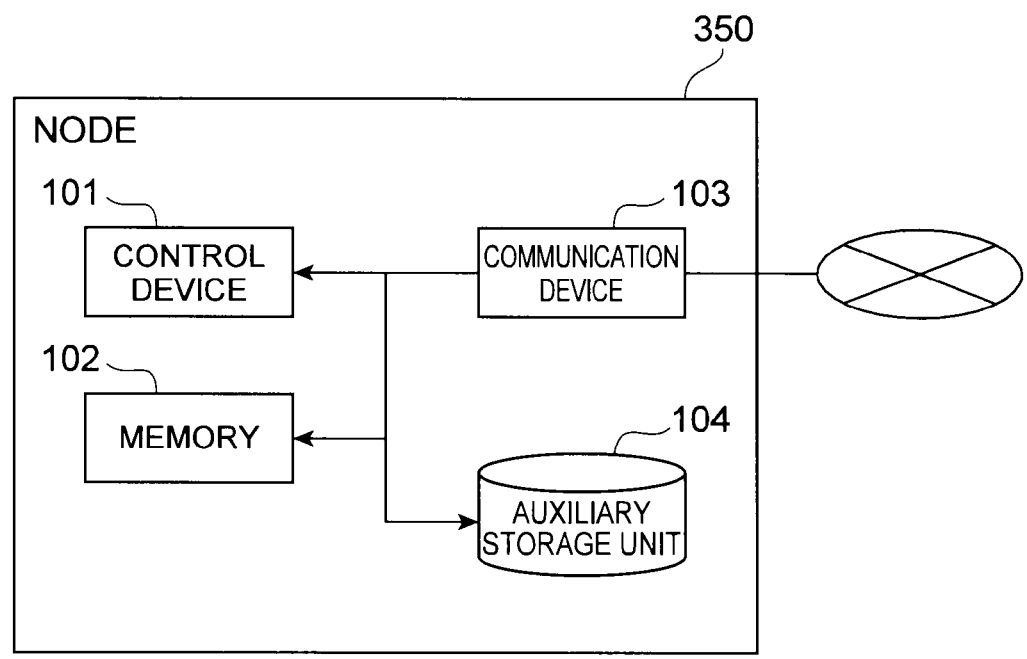
FIG. 7 is a diagram showing an example of a hardware configuration in each node shown in FIG. 2 and FIG. 3.

Next, referring to FIG. 7, a hardware configuration of each node (for example, the LMMS 350) included in the radio control unit 200 and the core network unit 300 illustrated in FIG. 2 or FIG. 3 will be shown. As shown in FIG. 7, each node such as the LMMS 350 physically includes a control device 101 such as a CPU (Central Processing Unit), a memory 102 such as a volatile semiconductor memory, for example, a RAM (Random Access Memory), a communication device 103 controlling communication, such as a LAN (Local Area Network) communication control card or board, and an auxiliary storage unit 104 such as a flash memory or a hard disk. The function of each node included in the core network unit 300, such as the LMMS 350, is implemented by reading prescribed software on hardware such as the control device 101 or the memory 102 to bring the communication device 103 into operation under the control of the control device 101, and by performing data read and write from/into the memory 102 or the auxiliary storage unit 104. The hardware configuration of the communication terminal 100 is similar except the following one point: the communication device 103 of the communication terminal 100 is an antenna or the like having the function of wirelessly connecting to the BTS 250.

Next, a flow of processing of the communication control system 10 in the present embodiment will be described using FIG. 8 to FIG. 13.

Figure 8:
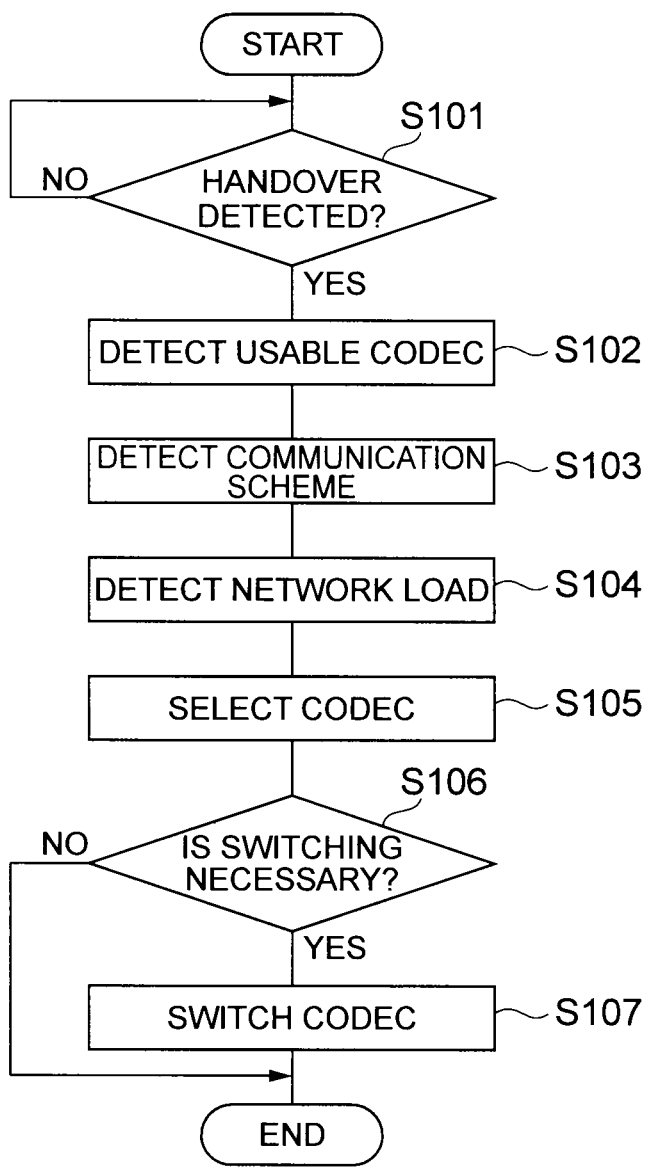
FIG. 8 is a diagram showing a flow of processing of the communication control system 10 in the present embodiment.

FIG. 8 shows a flow of processing in the communication control system 10 in the present embodiment. In this processing, communication is performed in advance between two communication terminals 100. A codec determined through codec negotiation between the two communication terminals 100 is applied to this communication. The handover detection unit 220 of the radio control unit 200 detects that a handover takes place in the communication terminal 100 (step S101: handover detection step).

The usable codec detection unit 321 of the core network unit 300 detects the kind of codec usable by the communication terminal 100 by asking the communication terminal 100 about the codec usable by the communication terminal 100 (step S102: information acquisition step).

If the communication terminal 100 performs a handover, the communication scheme detection unit 325 detects the communication scheme performed between the BTS 250 that forms the handover-destination communication area and the communication terminal 100 that has performed the handover, and the communication scheme of the communication performed by the communication terminal 100 on the other end communicating with the communication terminal 100 (step S103: information acquisition step).

If the handover detection unit 220 detects a handover, the network load detection unit 323 detects the load on the handover-destination network (step S104: information acquisition step).

The codec selecting unit 330 inputs the kind of codec usable by the communication terminal 100, the load status in the network, and the information about the communication scheme from the usable codec detection unit 321, the network load detection unit 323, and the communication scheme detection unit 325, respectively, and selects a codec after switching that is a codec to be applied to the communication after the handover, based on the input information (step S105; codec selecting step).

The codec switching unit 340 determines whether codec switching is necessary (step S106), and if it is determined that codec switching is necessary ("YES" in step S106), controls such that the codec after switching selected by the codec selecting unit 330 is applied to the communication performed by the communication terminal 100 (step S107: codec switching step).

If the codec switching unit 340 determines that codec switching is not necessary ("NO" in step S106), the process ends.

Figure 9:
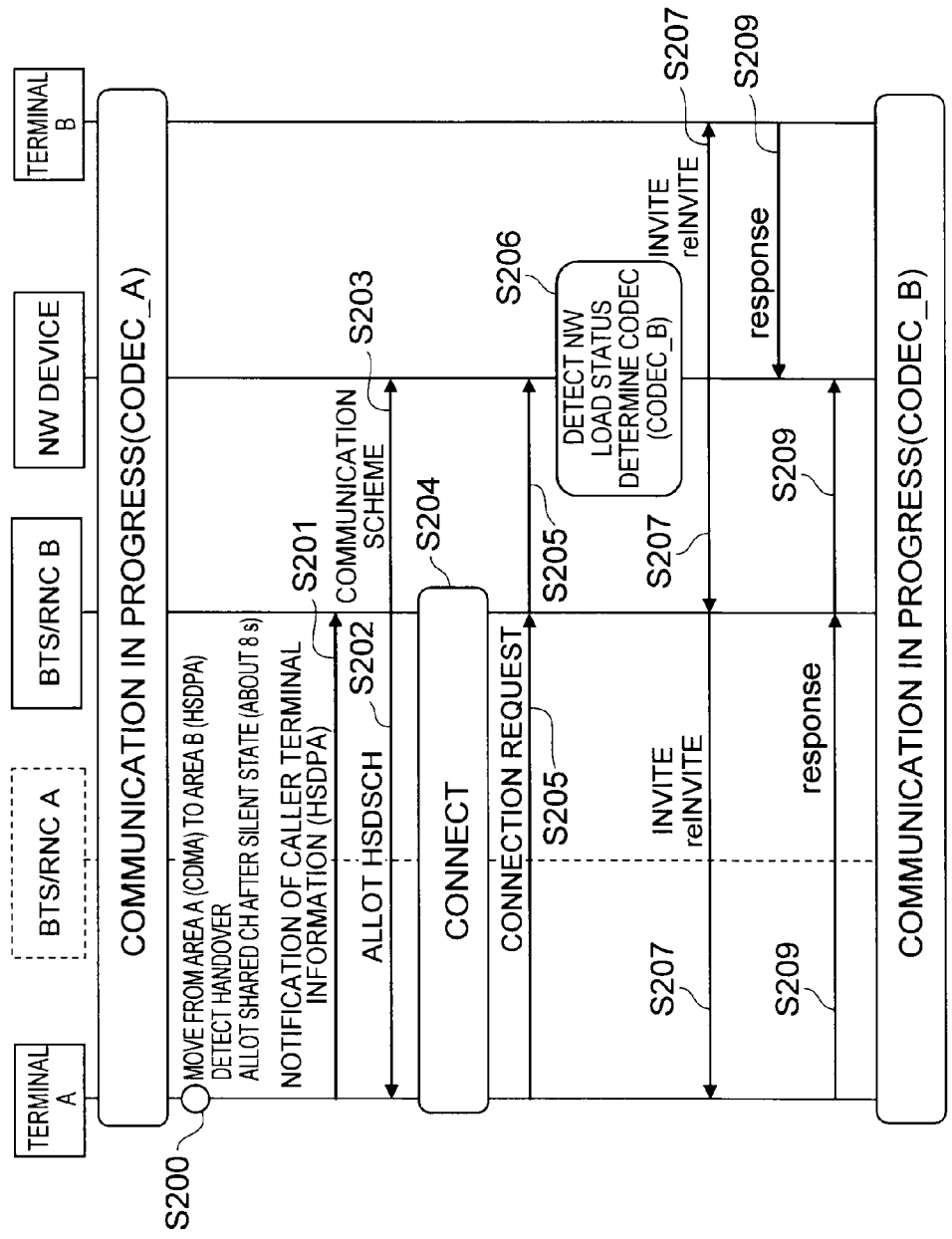
FIG. 9 is a diagram showing a flow of processing of the communication control system 10 in the present embodiment.

FIG. 9 is a diagram illustrating the flow of processing in the communication control system 10 in the present embodiment with a focus on the flow of information between the communication terminals 100. In this figure, for convenience of explanation, as for the communication terminals 100 performing communication, the communication terminal 100 performing a handover is referred to as a terminal A, and the communication terminal 100 on the other end communicating with the terminal A is referred to as a terminal B.

BTS/RNC A in this figure represents the BTS 250 and the RNC 260 that form a communication area (area A) in which the terminal A was present before the terminal A performs a handover. BTS/RNC B represents the BTS 250 and the RNC 260 that form a communication area (area B) in which the terminal A is present after the handover. An NW device in FIG. 9 refers to each node included in the core network unit 300 shown in FIG. 2 and FIG. 3.

The process shown in FIG. 9 starts from a state in which the terminal A is present in the communication area formed by the BTS/RNC A, the communication scheme is the CDMA scheme, and communication has already been performed through communication to which CODEC_A (for example, AMR-NB) is applied as a codec. In this state, when the terminal A moves from the communication area A in which the CDMA scheme can be used to the communication area B in which HSDPA can be used, the handover detection unit 220 of the radio control unit 200 detects that a handover takes place (which corresponds to step S101 in FIG. 8). Furthermore, the CDMA scheme used so far in the communication can no longer be used, thereby bringing about a silent state. If this state continues for a certain time (for example, about eight seconds), a shared channel applicable to both the CDMA scheme and the HSDPA scheme is allotted to the terminal A from a shared channel allotting unit (not shown) on the network side (step S200).

When a shared channel is allotted from the not-shown shared channel allotting unit, a notification unit (not shown) of the terminal A notifies the RNC 260 through the BTS 250 that constructs the area B of information that the terminal A can use HSDPA (step S201).

An HSDSCH allotting unit (not shown) of the RNC 260 receiving the notification allots HSDSCH, which is a dedicated channel for the HSDPA scheme, to the communication terminal 100 through the BTS 250 (step S202). The communication scheme notification unit 230 of the radio control unit 200 transmits information that the communication scheme of the communication terminal 100 is the HSDPA scheme, to the communication scheme detection unit 325 of the core network unit 300 through the communication control unit 210 (step S203, which corresponds to step S103 in FIG. 8). Preferably, the timing for the communication scheme notification unit 230 to transmit the information is at the point of time when it receives a signal concerning a transmission request from the communication scheme detection unit 325 of the core network unit 300.

When HSDSCH, which is a dedicated channel for the HSDPA scheme, is allotted to the communication terminal 100 by the not-shown HSDSCH allotting unit, communication is connected between the terminal A and the BTS/RNC B (step S204). A connection request unit (not shown) of the terminal A makes a connection request to the terminal B through the BTS/RNC B (step S205). In the example of the communication control system 10 shown in FIG. 2, this request is transmitted from the RNC 260 in the radio control unit 200 to the LMMS 350 in the core network unit 300 and is then transmitted via the LMMS 350, the GMMS 351, the TMMS 352, etc. to the LMMS 350 that controls the BTS 250 that constructs the communication area in which the terminal B is present. On the other hand, in the example of the communication control system 10 shown in FIG. 3, the connection request is transmitted from the RNC 260 to the CS-GW 355. Thereafter, using IP, it is transmitted to the CS-GW 355 that controls the BTS 250 that constructs the communication area in which the terminal B is present. The connection request unit (not shown) of the terminal A includes information about the codec kind usable in the terminal A into the connection request. The usable codec detection unit 321 thus detects the usable codec (which corresponds to step S102 in FIG. 8).

The network load detection unit 323 detects the load on the handover-destination network (which corresponds to step S104 in FIG. 8). The codec selecting unit 330 inputs the kind of codec usable by the communication terminal 100, the load status in the network, and the information about the communication scheme from the usable codec detection unit 321, the network load detection unit 323, and the communication scheme detection unit 325, respectively, and selects a codec after switching that is a codec to be applied to the communication after the handover, based on the input information (which corresponds to step S105 in FIG. 8) (step S206).

Here, as an example for explanation, it is assumed that the codec selecting unit 330 selects CODEC_B (for example, AMR-WB) as a codec after switching. The codec switching unit 340 determines whether codec switching is necessary (which corresponds to step S106 in FIG. 8). In the example shown in FIG. 8, the codec before switching (CODEC_A) and the codec after switching (CODEC_B) are different. Therefore, the codec switching unit 340 determines that codec switching is necessary. If the codec switching unit 340 determines that codec switching is necessary, the codec switching unit 340 transmits INVITE or reINVITE, which is a signal for asking the terminal A and the terminal B to perform communication with the codec after switching, through the switchboard communication control unit 310 and the communication control unit 210 of the radio control unit 200, so that communication is performed using CODEC_B that is the codec after switching (step S207, which corresponds to step S107 in FIG. 8).

Upon receiving INVITE or reINVITE, the terminal A and the terminal B transmit "response" (step S209).

After the terminal A and the terminal B transmit "response," communication to which the codec after switching (CODEC_B) is applied is performed between the terminal A and the terminal B.

Figure 10:
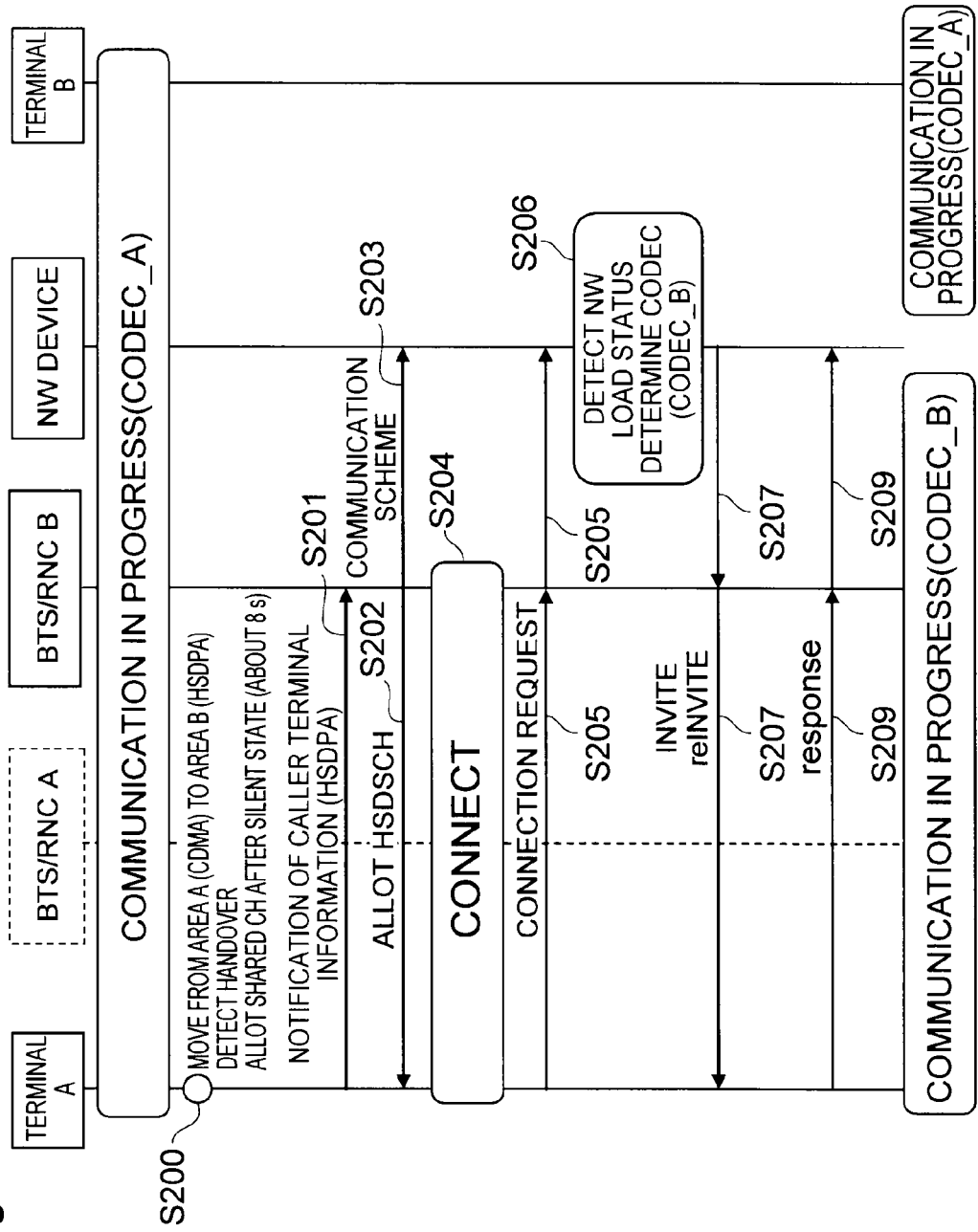
FIG. 10 is a diagram showing a flow of processing of the communication control system 10 in the present embodiment.

The codec switching unit 340 may apply different codecs between communication performed by the terminal A and communication performed by the terminal B. The flow of the processing in this case is shown in FIG. 10. The codec switching unit 340, which determines that codec switching to CODEC_B is necessary, transmits INVITE or reINVITE as a request for codec switching only to the terminal A that has performed a handover (step S207). The terminal A thus performs communication using the codec after switching (CODEC_B). The terminal B is performing communication to which CODEC_A that is the codec before switching is applied because the codec switching unit 340 does not transmit to the terminal B information about a request to perform communication using the codec after switching (CODEC_B) selected by the codec selecting unit 330. This can be implemented by a trans-codec unit (not shown) in the core network unit 300 performing trans-codec between CODEC_A and CODEC_B.

In this processing, it is only necessary to change only one codec and it is not necessary to perform codec negotiation with the other terminal, thereby alleviating a load on the other terminal.

Figure 11:
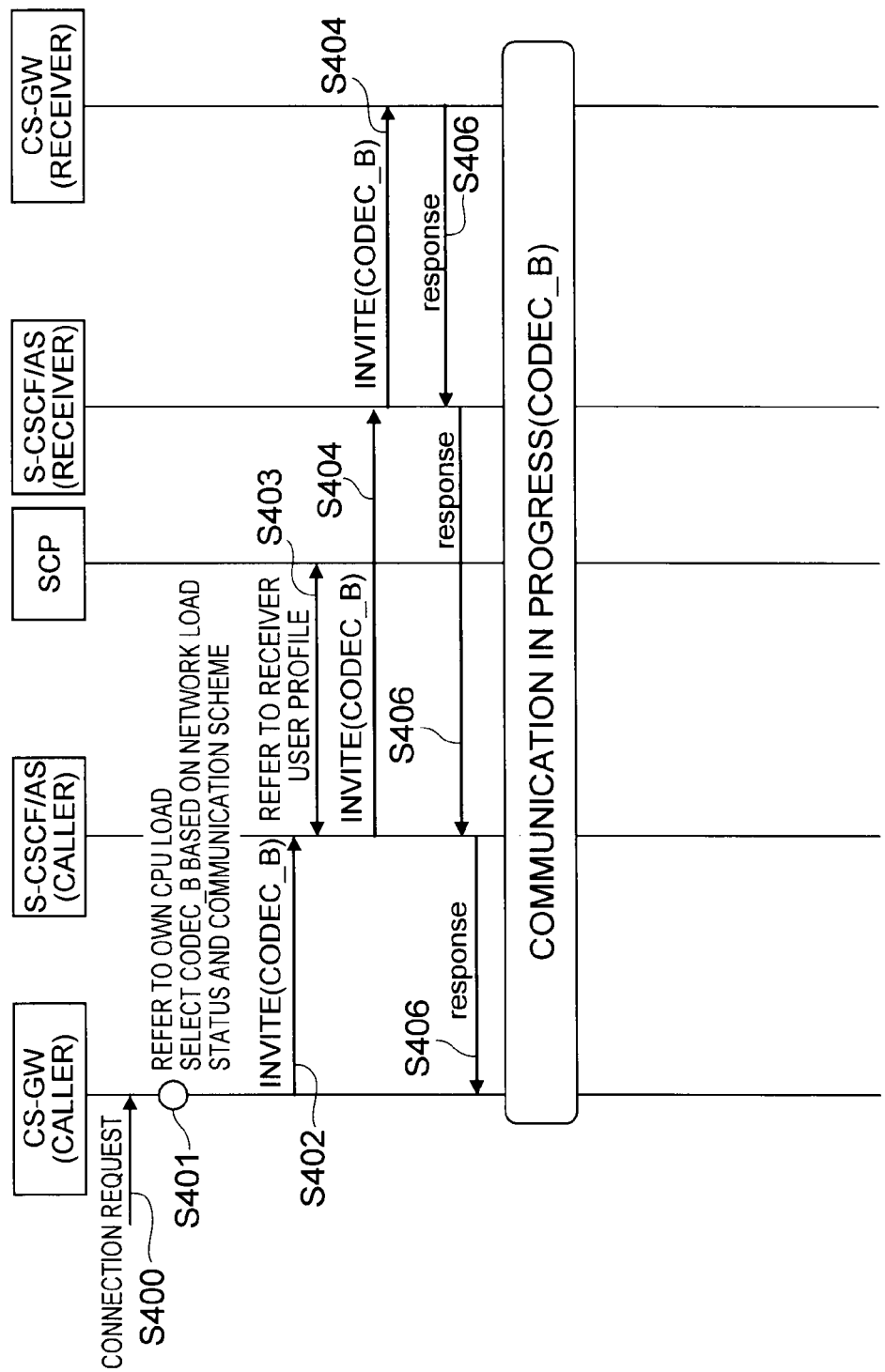
FIG. 11 is a diagram showing a flow of processing of the communication control system 10 in the present embodiment.

Next, a flow of processing in the core network unit 300 will be described with a main focus on an information flow using FIG. 11. FIG. 11 corresponds to the processing after step S206 in FIG. 9 and FIG. 10. More specifically, the processing in FIG. 11 starts from a state in which the handover detection unit 220 has already detected a handover, the usable codec detection unit 321 has already detected the kind of usable codec, and the communication method detection unit 325 has already detected the communication kind of communication performed by the terminal A. It is noted that the sequence diagram in FIG. 11 shows an example in which the communication control system 10 functions with the hardware configuration shown in FIG. 3. This is applicable to the case where the communication control system 10 functions with the hardware configuration shown in FIG. 2.

The switchboard communication control unit 310 in the CS-GW 355 that controls the BTS 250 and the RNC 260 forming the communication area in which the terminal A is present receives a connection request transmitted by the terminal A (step S400, which corresponds to step S205 in FIG. 9 and FIG. 10). The network load detection unit 323 detects the CPU load (for example, CPU load) in the handover-destination network (which corresponds to step S104 in FIG. 8). The codec selecting unit 330 selects a codec after switching (CODEC_B) based on the CPU load, the communication schemes of communications performed by the terminal A and the terminal B, and the usable codec kind (step S401, which corresponds to step S105 in FIG. 8). The codec switching unit 340 determines whether codec switching is necessary by comparing the codec after switching (CODEC_B) selected by the codec selecting unit 330 with the codec before switching (CODEC_A) (not shown in FIG. 11, step S106 in FIG. 8), and, if determining that it is necessary, refers to the SCP 360 to acquire a receiver user profile (location information of the terminal B) (step S403). INVITE is transmitted from the caller-side CS-GW 355 to the receiver-side CS-GW 355 along the determined route to the terminal B based on the acquired user profile (step S404, which corresponds to step S107 in FIG. 8 and step S207 in FIG. 9).

The transmitted INVITE includes information indicative of CODEC_B that is the codec after switching.

The CS-GW 355 on the terminal B side receiving INVITE from the CS-GW 355 on the terminal A side transmits OK response (step S406, step S107 in FIG. 8, and step S209 in FIG. 9). OK response transmitted by the CS-GW 355 on the terminal B side is transmitted to the CS-GW 355 on the terminal A side through the S-CSCF 365 and the AS 375.

FIG. 11 shows the flow of the processing in the same network. Next, the processing between networks (that is, the processing in the case where the terminal A and the terminal B communicate across networks) will be described using FIG. 12.

Figure 12:
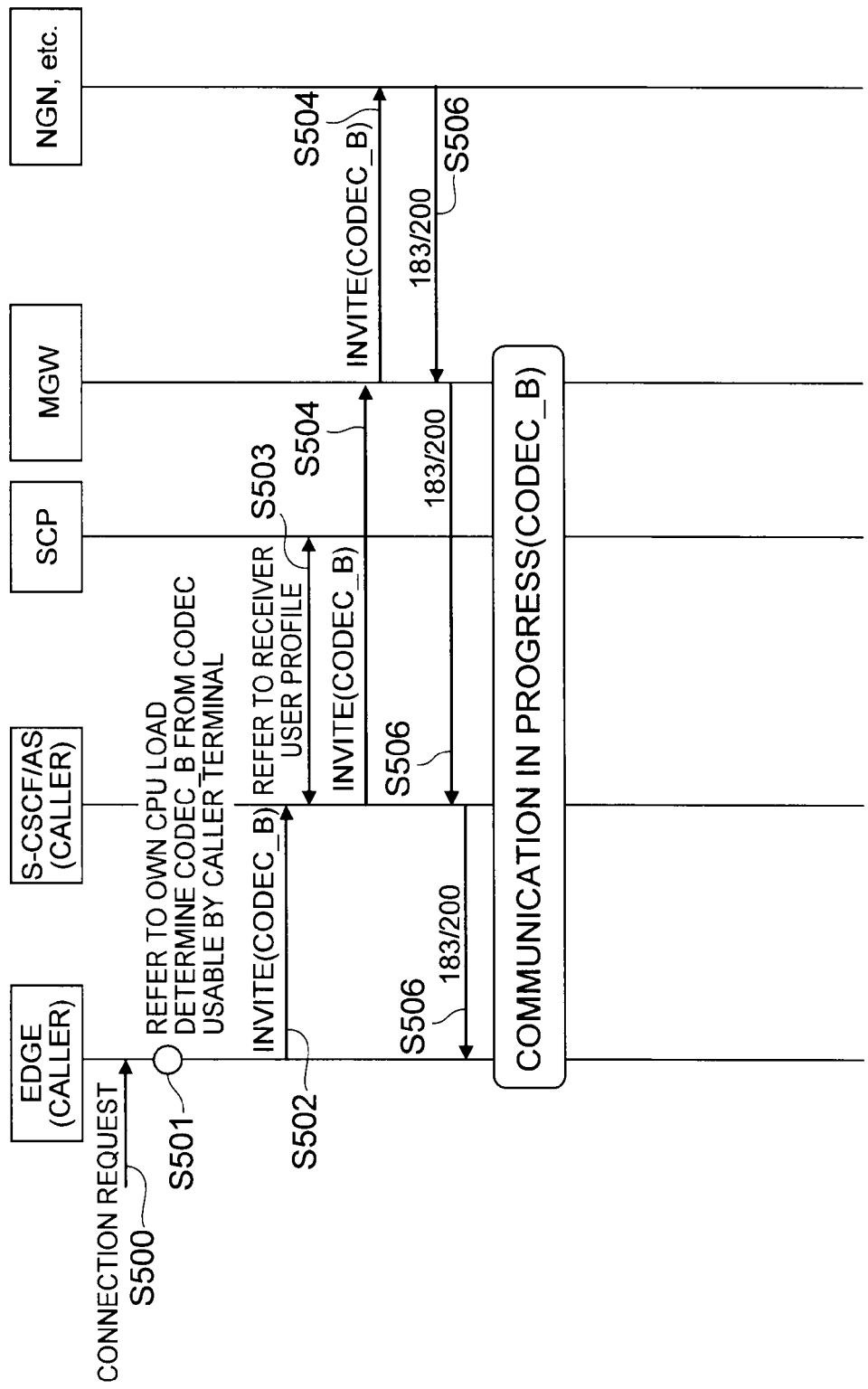
FIG. 12 is a diagram showing a flow of processing of the communication control system 10 in the present embodiment.

Steps S500, S501, S502, and S503 in FIG. 12 are similar to steps S400, S401, S402, and S403 in FIG. 11, respectively.

The codec switching unit 340 transmits INVITE to the MGW 395 which corresponds to a gateway in the network (step S504, which corresponds to step S107 in FIG. 8). The MGW 395 forwards INVITE to another network (NGN in the example for explanation). It is noted that INVITE includes information indicative of CODEC_B that is the codec after switching. OK response to INVITE is transmitted from the NGN to the MGW 395. OK response transmitted from the NGN to the MGW 395 is forwarded by the MGW 395 and received by the switchboard communication control unit 310 (step S506).

Accordingly, communication to which the codec after switching is applied is performed between the communication terminals 100 through the switchboard communication control unit 310 and the communication control unit 210.

Figure 13:
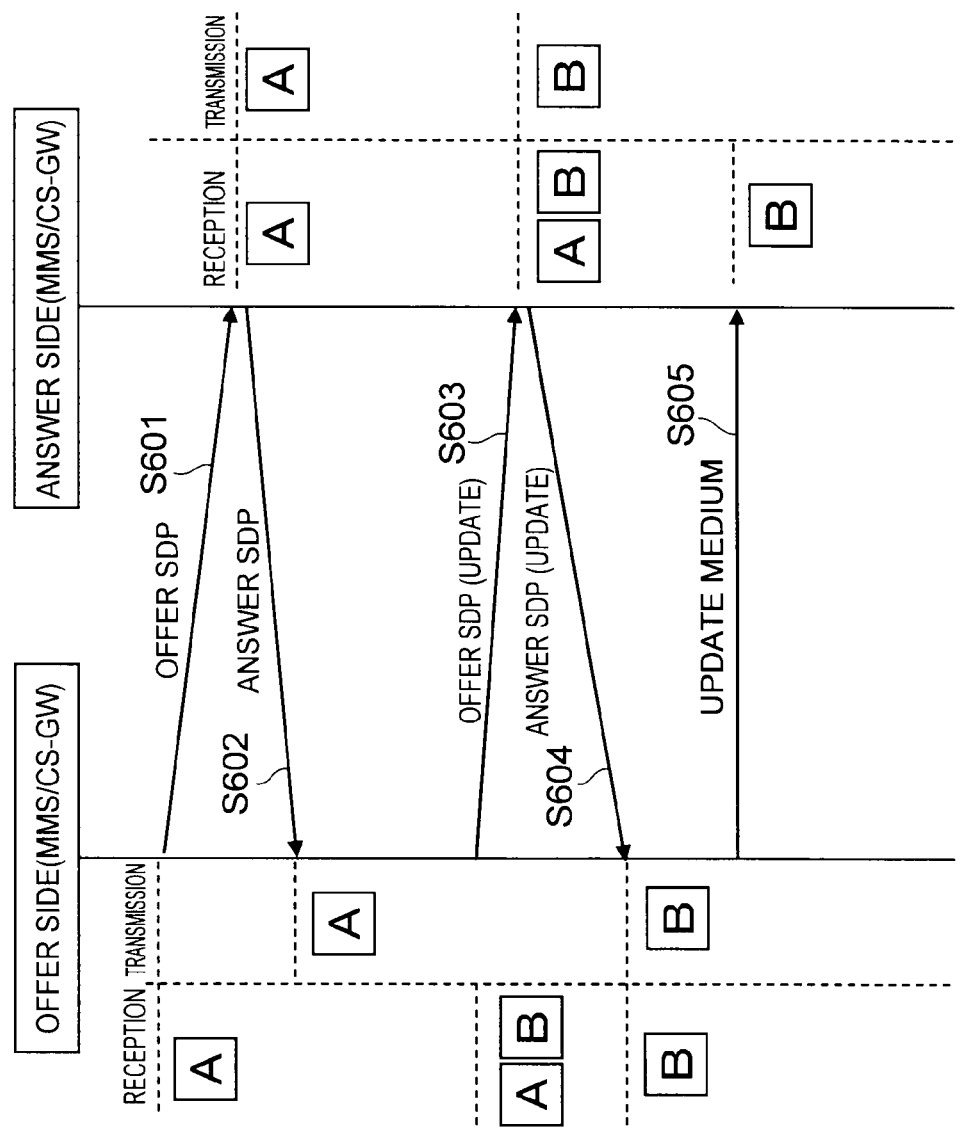
FIG. 13 is a diagram showing an example of a codec changing method.

FIG. 13 is a diagram for explaining an example of a codec switching method in the core network unit 300. In the communication control system 10 in the present embodiment, the codec switching unit 340 controls the switchboard communication control unit 310 and the communication control unit 210 such that communication to which the codec after switching selected by the codec selecting unit 330 is applied is performed. The method of this control (the codec switching method) is not intended to be specifically limited. An example of the codec switching method shown in FIG. 13 will be described below.

FIG. 13 shows a flow of the processing between the LMMS 350 or the CS-GW 355 on the terminal A side performing a handover (hereinafter referred to as the "offer side") and the LMMS 350 or the CS-GW 355 on the terminal B side communicating with the terminal A (hereinafter referred to as the "answer side"). At the point of time when the processing starts, the offer-side terminal A and the answer-side terminal B have not initiated communication.

The offer side makes a proposal to the answer side to perform communication to which the codec before switching (CODEC_A) is applied (step S601).

When the answer side receives the proposal to perform communication to which the codec before switching (CODEC_A) is applied, and if it is possible, a state in which transmission and reception with the codec before switching (CODEC_A) is enabled is assumed, and OK response is transmitted to the offer side (step S602). Here, the state in which reception or transmission with a certain codec is enabled refers to a state in which reception or transmission of communication to which that codec is applied is enabled. In FIG. 13, for example, the state in which reception with the codec before switching (CODEC_A) is enabled on the offer side is represented by "A surrounded by a rectangle" entered at "reception" on the "offer side." For example, as shown in FIG. 13, on the answer side, at the point of time when the offer SDP is received from the offer side, the state in which reception and transmission with the codec before switching (CODEC_A) is enabled is assumed.

When the offer side receives OK response, the state in which reception with the codec before switching (CODEC_A) is enabled is assumed. In the following processing (step S601 and step S602), codec A is determined by a not-shown determination unit in the core network unit 300, so that, based on the determination, the communication control units 210 and the switchboard communication control units 310 on the offer side and the answer side transmit/receive signals for processing.

Although not shown in FIG. 13, the offer-side communication terminal A performs a handover by moving from one communication area to another communication area between step S602 and step S603 in FIG. 13. The handover detection unit 220 of the radio control unit 200 detects that the handover took place (which corresponds to step S101 in FIG. 8), and the codec selecting unit 330 of the core network unit 300 selects a codec after switching based on each information received from the usable codec detection unit 321, the network load detection unit 323, and the communication scheme detection unit 325, or the information held by the node load information holding unit 335 (which is not shown in FIG. 13 and corresponds to steps S102 to S105 in FIG. 8). As an example for explanation, it is assumed that the codec selecting unit 330 selects CODEC_B (indicated by B surrounded by a rectangle in FIG. 13) as a codec after switching.

The codec switching unit 340 transmits offer SDP (update) as a proposal of communication to which CODEC_B is applied to the answer side by controlling the switchboard communication control unit 310 and the communication control unit 210 (step S603, which corresponds to step S107 in FIG. 8 as well as steps S402 and S404 in FIG. 11). At the point of time when the offer SDP (update) is transmitted, the offer side enters a state in which reception with the codec after switching (CODECB) is enabled in addition to the codec before switching (CODEC_A).

On the other hand, the answer side receiving the offer SDP (update) enters a state in which communication to which the codec after switching (CODEC_B) in addition to the codec before switching (CODEC_A) is applied can be received. At the same time, the answer side receiving the offer SDP (update) interrupts transmission of communication with the codec before switching (CODEC_A) and enters a state in which transmission with the codec after switching (CODEC_B) is enabled. The answer side transmits answer SDP (update) to the offer side using the codec after switching (CODEC_B) (step S604, which corresponds to step S107 in FIG. 8 and step S406 in FIG. 11). The offer side receiving the answer SDP (update) interrupts transmission and reception with the codec before switching (CODEC_A). At the same time, the offer side receiving the answer SDP (update) enters a state in which transmission with the codec after switching (CODEC_B) is enabled.

The offer side transmits an update medium (that is, data) using the codec after update (CODEC_B) (step S605).

The answer side interrupts reception with the codec before switching (CODEC_A) at the point of time when the update medium is received.

The processing above allows codec switching from the codec before switching (CODEC_A) to the codec after switching (CODEC_B). FIG. 13 shows the flow of the processing in the core network 300 and only illustrates the processing between the offer side (MMS/CS-GW) and the answer side (MMS/CS-GW) which are nodes within the network. However, actually, codec switching is performed on communication performed between the terminal A and the terminal B. The content of the processing is similar even when the "offer side (MMS/CS-GW)" and the "answer side (MMS/CS-GW)" in FIG. 13 are changed to the "terminal A" and the "terminal B," respectively.

Next, the operation and effects of the present embodiment will be described.

In the communication control system 10 in the present embodiment, when the communication terminal 100 performs a handover, a codec after switching is selected based on information about the handover, and communication to which the codec after switching is applied is performed. Therefore, it is possible to select an optimum codec flexibly adapting to a change in the communication environment and to switch to the optimum codec during communication.

The communication control system 10 in the present embodiment selects a codec after switching based on a congestion state in the communication network, information of the communication scheme, and the like, and performs communication to which the selected codec is applied, thereby making it possible to select an optimum codec in accordance with the communication environment of the handover destination and to switch to the selected codec at the time of a handover.

The information acquisition unit 320 of the communication control system 10 further includes the network load detection unit 323 detecting a load status in the communication network to which the BTS 250 connects, so that a more proper codec can be selected by detecting the load status in the handover-destination network.

The network load detection unit 323 senses a CPU load in network equipment provided in the communication network for controlling communication performed by the communication terminal 100 and detects the load status in the communication network based on the sensed CPU load. The load status in the network can be detected reliably by sensing the CPU load.

The codec selecting unit 330 selects a codec having the lowest quality among the applicable codecs as a codec after switching if the load status in the communication network that is detected by the network load detection unit 323 indicates a load greater than a prescribed threshold. When the load status on the network is heavy, any additional load on the network can be minimized by selecting a codec having the lowest quality.

The network load detection unit 323 senses the probability of call loss in the communication network and detects the load status in the communication network based on the sensed probability of call loss. Therefore, the load status in the network that conforms more to the actual load status can be detected.

The information acquisition unit 320 includes the communication scheme detection unit 325 detecting the communication scheme in the communication performed between the communication terminal 100 and the BTS 250, so that a codec after switching can be selected according to the communication scheme.

The communication scheme detection unit 325 additionally detects the communication scheme performed by the receiver-side communication terminal 100 (the other communication terminal), and the codec selecting unit 330 selects a codec after switching based on the communication scheme having lower quality between the communication schemes performed by the caller-side and receiver-side communication terminals 100 (one communication scheme and another communication scheme). The codecs can be switched more safely based on the communication scheme having lower quality. If the communication schemes performed by the caller-side and receiver-side communication terminals 100 are the same, a codec after switching is selected based on that communication scheme.

The communication control system 10 further includes the node load information holding unit 335 storing and holding restriction information indicating that the quality of communication is limited for a prescribed area. The codec selecting unit 330 refers to the restriction information held by the node load information holding unit 335, and if the communication terminal 100 is present in the area indicated by the restriction information, selects a codec having the lowest quality among the applicable codecs as a codec after switching. Therefore, for example, when an event that attracts many people is held, the quality of communication can be limited only for a prescribed area.

It is expected that a codec change frequently occurs when a terminal moves across areas. In view of such a situation, a codec change may be carried out, for example, only when the quality is expected to be improved by a certain value or more, or when the current codec would tighten the network.

When a codec change is carried out, the quality of communication is changed. Then, it is desirable that a notification should be given to the user by displaying that the codec is changed (for example, such display as "the communication continues with the degraded quality as you have moved to a congested area").

REFERENCE SIGNS LIST

10 . . . communication control system, 100 . . . communication terminal, 200 . . . radio control unit, 210 . . . communication control unit, 220 . . . handover detection unit, 230 . . . communication scheme notification unit, 250 . . . BTS, 260 . . . RNC, 300 . . . core network unit, 310 . . . switchboard communication control unit, 320 . . . information acquisition unit, 321 . . . usable codec detection unit, 323 . . . network load detection unit, 325 . . . communication method detection unit, 330 . . . codec selecting unit, 335 . . . node load information holding unit, 340 . . . codec switching unit, 350 . . . LMMS, 351 . . . GMMS, 352 . . . TMMS, 355 . . . CS-GW, 360 SCP, 365 . . . S-CSCF, 375 . . . AS, 395 . . . MGW.

What is claimed is:

1. A communication control system, comprising:
one or more processors configured to:
detect a handover in which a communication terminal present in a communication area formed by a base station moves from the communication area to a communication area formed by another base station;
acquire, if the handover is detected, information based on the handover for use in codec switching for switching a codec applied to communication currently performed by the communication terminal;
detect a communication scheme in communication performed between the communication terminal and the another base station;
detect another communication scheme performed by another communication terminal on another end communicating with the communication terminal;
select a codec after switching based on the acquired information and based on a communication scheme having lower quality between the communication scheme and the another communication scheme; and
apply the selected codec to the communication currently performed, wherein the one or more processors are further configured to sense a probability of call loss in a communication network to which the another base station connects and detect a load status in the communication network based on the sensed probability of call loss.

2. The communication control system according to claim 1, wherein
the one or more processors are further configured to sense a central processing unit (CPU) load in network equipment provided in the communication network for controlling communication performed by the communication terminal and detect the load status in the communication network based on the sensed CPU load.

3. The communication control system according to claim 1, wherein,
when the load status in the communication network that is detected indicates a load greater than a prescribed threshold, the one or more processors select a codec having lowest quality among applicable codecs, as the codec after switching.

4. The communication control system according to claim 1, further comprising:
a memory that stores restriction information indicating that communication restriction is imposed on a prescribed area, wherein
the one or more processors refer to the restriction information and, if the communication terminal is present in the area indicated by the restriction information, select a codec having lowest quality among applicable codecs, as the codec after switching.

5. A communication control method comprising:
detecting a handover in which a communication terminal present in a communication area formed by a base station moves from the communication area to a communication area formed by another base station;

acquiring, if a handover is detected, information based on the handover for use in codec switching for switching a codec applied to communication currently performed by the communication terminal;
detect a communication scheme in communication performed between the communication terminal and the another base station;
detect another communication scheme performed by another communication terminal on another end communicating with the communication terminal;
selecting a codec after switching based on the acquired information and based on a communication scheme having lower quality between the communication scheme and the another communication scheme;
applying the selected codec to the communication currently performed;
sense a probability of call loss in a communication network to which the another base station connects; and
detect a load status in the communication network based on the sensed probability of call loss.

* * * * *